(12) United States Patent
Nuebling

(10) Patent No.: US 6,966,494 B2
(45) Date of Patent: Nov. 22, 2005

(54) CODE READER

(75) Inventor: Ralf Ulrich Nuebling, Denzlingen (DE)

(73) Assignee: Sick AG, Waldkirch (DE)

( * ) Notice: Subject to any disclaimer, the term of this patent is extended or adjusted under 35 U.S.C. 154(b) by 0 days.

(21) Appl. No.: 10/934,128

(22) Filed: Sep. 2, 2004

(65) Prior Publication Data

US 2005/0051629 A1 Mar. 10, 2005

(30) Foreign Application Priority Data

Sep. 5, 2003 (DE) ................................ 103 40 924

(51) Int. Cl.$^7$ .............................................. G06K 7/10
(52) U.S. Cl. ............................ 235/462.36; 235/462.32
(58) Field of Search ...................... 235/462.01, 462.32, 235/462.36, 462.38; 250/566

(56) References Cited

U.S. PATENT DOCUMENTS

| | | | |
|---|---|---|---|
| 5,185,822 A | 2/1993 | Miura | |
| 5,245,172 A | 9/1993 | Esslinger et al. | |
| 5,422,471 A * | 6/1995 | Plesko | 235/462.36 |
| 5,717,200 A * | 2/1998 | Hashimoto | 250/208.1 |
| 5,764,398 A * | 6/1998 | Hayakawa | 359/203 |
| 5,811,828 A * | 9/1998 | Laser | 250/566 |
| 6,714,351 B2 * | 3/2004 | Giordano et al. | 359/494 |

FOREIGN PATENT DOCUMENTS

| | | |
|---|---|---|
| GB | 2 354 361 A | 3/2001 |
| WO | WO 93/14470 A1 | 7/1993 |

* cited by examiner

*Primary Examiner*—Daniel Stcyr
*Assistant Examiner*—April Taylor
(74) *Attorney, Agent, or Firm*—Townsend and Townsend and Crew LLP

(57) ABSTRACT

An identification device, especially one for detecting unidimensional and/or two-dimensional codes, which has a position-resolving photoreceiver arranged in a housing and a reception optics coordinated with it and also installed in the housing. The entire reception optics and the position-resolving photoreceiver are immovably mounted in a housing of the identification device. For focusing at different object distances, an effective optical back focal distance is changed with only an adjustable deflection mirror that is positioned between the photoreceiver and the reception optics.

11 Claims, 3 Drawing Sheets

CODE READER

BACKGROUND OF THE INVENTION

The invention concerns an identification device, and especially a code reader, for detecting unidimensional and/or two-dimensional codes with a position-resolving photoreceiver and associated reception optics installed in a housing.

Known identification devices of this type have reception optics that project in its focal plane an image of a code in the object plane. A position-resolving photoreceiver is situated in the focal plane which has several photoreceiver pixels arranged in line or matrix form.

The different contrasts in the code and, consequently, also in the image of the code generate different photocurrents in the individual photoreceiver pixels, from which the contents of the code can be identified with appropriate signal processing.

Such codes are used in a variety of applications, such as for identifying and controlling individual objects on conveyors. The code is not limited to any particular kind of code and includes all types of information media that can be recognized by an image processing device.

Today's sophisticated identification devices are expected to read increasing amounts of information contained in the smallest possible code areas. This means that a good position resolution is demanded of the identification device. Especially high demands are placed on the identification device when the code can be located within a large focus depth range. Sophisticated identification devices must further have a high reading rate, which requires fast reception optics. These two conditions, namely a large focal depth range and a fast reading rate reception optics, require an automatic focusing system.

Known identification devices with an automatic focusing system focus by moving the entire reception optics, or at least subassemblies or individual components thereof, along the optical axis, while the position-resolving photoreceiver remains stationary. For this, the optics is attached to a threaded mount that is typically moved by means of a servomotor. The relatively large mass of the components of fast reading, long-focal-length receiving lenses limits the speed with which they can be moved. Such systems are further subject to mechanical stresses in the region of their bearings and are not well suited for continuous use over long periods of time. Furthermore, this focusing method is generally time-consuming and is therefore not well suited for responding to rapidly changing code distances.

A second group of known identification devices with automatic focusing systems focus by stationarily positioning the receiving optics, while the position-resolving photoreceiver, possibly together with the circuit board carrying it, including additional electronic components, moves in the direction of the optical axis. One such device is disclosed in U.S. Pat. No. 5,245,172. In addition to the mechanical load on such an auto-focusing system for the photoreceiver, including its additional electrical components, the required multistrand electrical connection is subject to continuous movement. Since focusing systems of this type are subject to between about $10^7$ to $10^9$ cycles over their lifetime, interruptions of the electrical connection or failures in the mechanically stressed components are not infrequent.

SUMMARY OF THE INVENTION

It is an object of the present invention to provide an automatic focusing system capable of quickly adjusting itself to different object distances with little or no wear over lengthy periods of time for optimizing the identification of codes.

For this, the entire reception optics as well as the position-resolving photoreceiver are immovably mounted in a housing of the identification device, and the effective focal distance is changed with an adjustable deflection mirror arranged between the photoreceiver and the reception optics.

A principal advantage of this focusing system is that only a simple deflection mirror having a small mass and no electrical connections needs to be adjusted. The reception optics, the photoreceiver and all electrical connections are stationarily arranged in the housing at their precise optical positions. The identification device of the invention is therefore able to focus on codes situated at different distances from the identification devices quickly over long periods of time with little or no wear and little energy consumption.

Position and angular adjustments of the deflection mirror are performed simultaneously with only a single mechanical control setting. As a result, the focusing system of the present invention saves space and is economical to produce and maintain.

In a preferred embodiment, when focusing with the deflection mirror, the center of the image is not shifted when it is focused on the photoreceiver. By preserving this coordination of image center and position-resolving photoreceiver over the focusing range, the direction of the viewing range is advantageously not changed. As a result, the identification device can generate information concerning the current position of the code relative to the receiving axis in addition to identifying the code content.

Depending on the required focusing parameters, i.e. the focusing speed, the repetition frequency, and the focusing range, both linear and circular actuators can be used. For a given application, this permits the use of the most suitable actuator such as, for example, magnetic moving coils, pneumatic/hydraulic cylinders, etc.

In another embodiment of the invention, the deflection mirror is attached to a swivel arm which is movable about a pivot axis. By pivoting the swivel arm and thus the deflection mirror about the pivot axis, which is oriented perpendicular to the optical axis of the receiving optics, the effective optical distance between the reception optics and the position-resolving photoreceiver can be lengthened or shortened as needed. The position of the pivot axis and the length of the swivel arm are coordinated with the optical characteristics of the reception optics so that the focal length as well as the angle of deflection are simultaneously changed, while the center of the image on the photoreceiver changes little or not at all.

In a further embodiment, the focal length of the deflection mirror is changed, while the image center on the photoreceiver is maintained by mounting the deflection mirror on a connecting rod of a four-bar linkage. By changing the length of the connecting rod, the size of both links, and the position of the fixed points of the four-bar linkage, additional freedom is obtained for optimally changing the position and angle for a given application. A further advantage of a four-bar linkage as contrasted with a swivel arm is that it requires less space and lends itself better for integration into the overall mechanical arrangement.

Another advantage of the invention is that the mechanical connections needed to adjust the deflection mirror in the housing of the identification device can consist of only one or more pivot joints, which are economically and technically superior to sliding or cam-operated connections. This advantage exists both when the deflection mirror is mounted on a swivel arm and when it is mounted on a four-bar linkage. Since these pivot joints move over a limited range of pivot angles, flat, flexible spring strips can be substituted for the pivot joints. When the spring strip involves a crossed strip arrangement, a well-defined, play-free rotary bearing function is obtained, which assures a stable and wear-free rotary movement for long periods of time.

DESCRIPTION OF THE PREFERRED EMBODIMENTS

Figure 1:
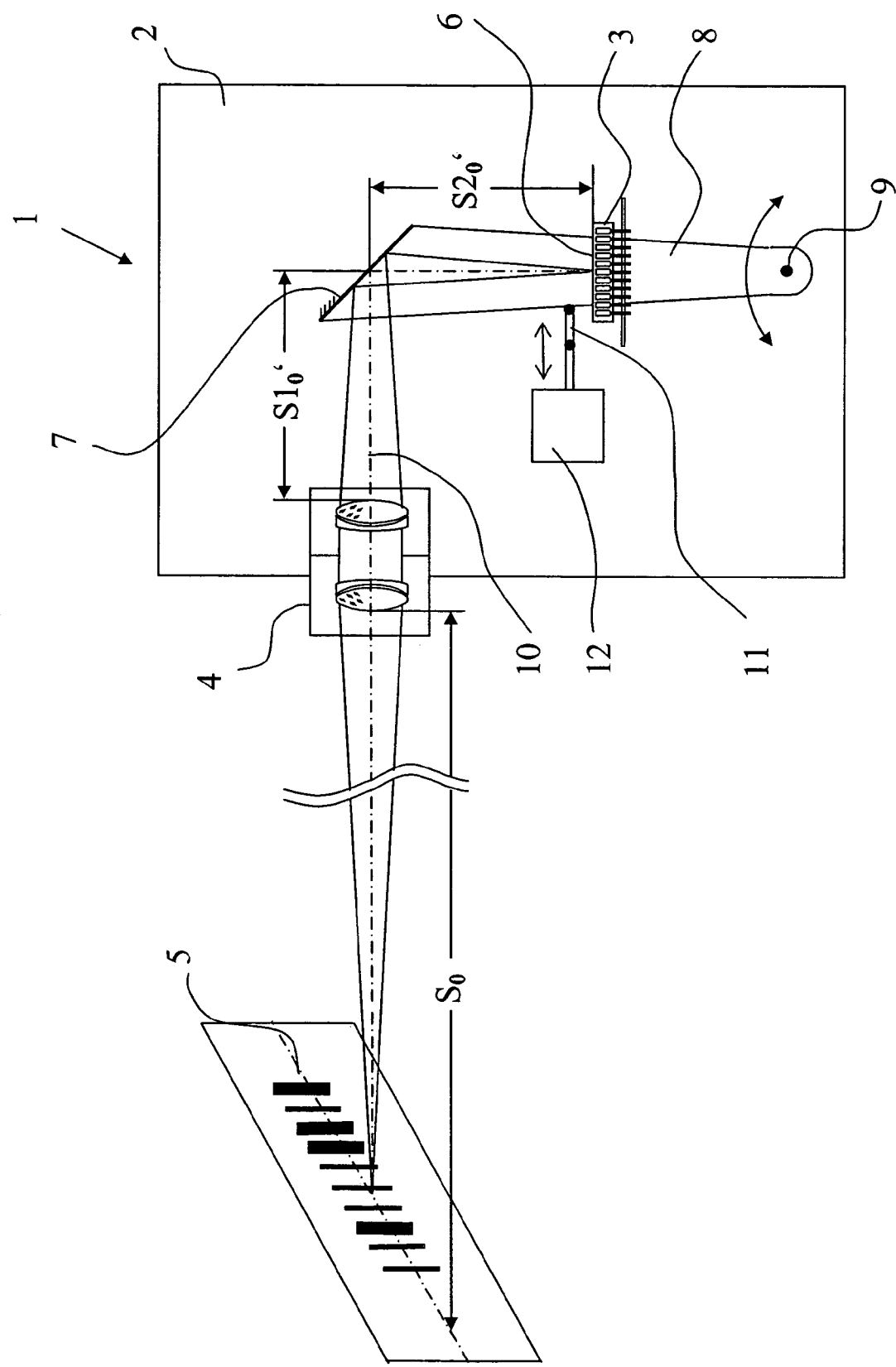
FIG. 1 is a schematic side view of an identification device constructed in accordance with the invention and provided with a focusing device having a deflection mirror mounted on a swivel arm for focusing over medium object focal distance.

FIG. 1 shows an example of the identification device as a code reader 1 that has a position-resolving photoreceiver 3 in a housing 2. When detecting a unidimensional code, the position-resolving photoreceiver 3 can, for example, be configured as a CCD line or CMOS line. When the code reader is used to detect two-dimensional information, the position-resolving photoreceiver 3 can be a CCD surface or a CMOS surface, for example. Further, a reception optics 4 is positioned in housing 2 and projects an image of an object 5 onto a surface 6 of position-resolving photoreceiver 3.

Depending on the particular application of the code reader and the environment of its use, the object is illuminated by a lighting device (not shown in FIG. 1). This lighting device has one or more light sources and can either be integrated in the code reader 1 or can be a self-standing external unit.

If the object 5, as shown in FIG. 1, is spaced from the code reader by an object or front focal distance $s_0$, the image of the object will be projected at an image or back focal distance $s_0'$ ($s_0'=s1_0'+s2_0'$). The back focal distance s' is essentially determined by object focal distance s and the focal length of reception optics 4. The path of the light between the reception optics 4 and the position-resolving photoreceiver 3 is deflected about 90° by a planar deflection mirror 7. The back focal distance s' is thereby divided into the two partial distances s1' and s2'. The surface of the deflection mirror 7 is perpendicularly secured to a swivel arm 8. A pivot shaft 9 is perpendicular to the optical axis 10 of the reception optics and connects swivel arm 8 to housing 2. A movable push rod 11 and a linear actuator 12 are connected to the swivel arm 8. The actuator 12 swivels arm 8 and with it deflection mirror 7 about pivot shaft 9. Instead of linear actuator 12 shown in FIG. 1, other actuators, such as a circular actuator in the form of a stepping motor, can be used for moving pivot shaft 9. Magnetic moving coils, pneumatic/hydraulic cylinders and the like can also be used for moving the swivel arm.

Figure 2:
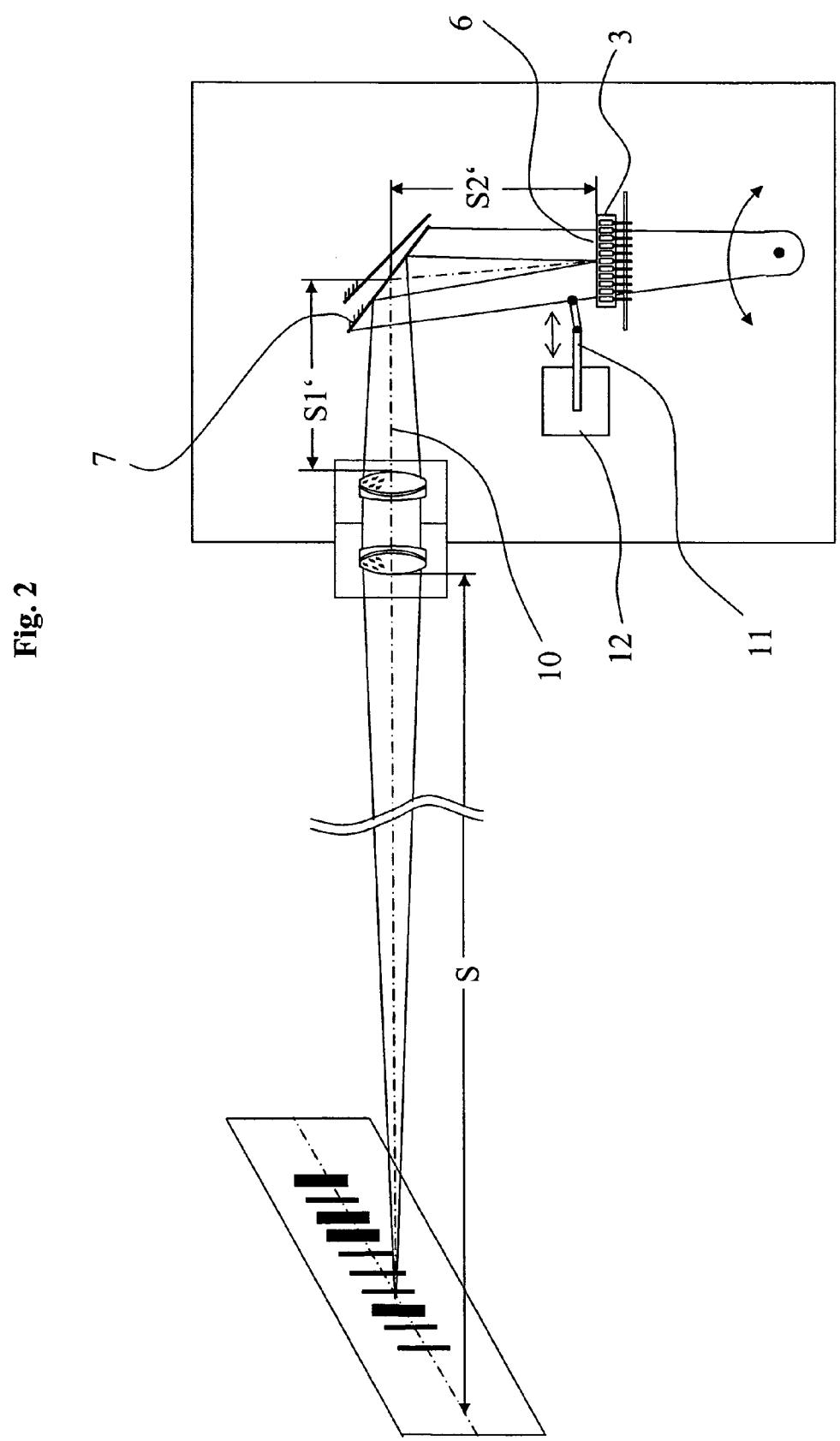
FIG. 2 is a schematic side view corresponding to FIG. 1 for focusing over a maximum object focal distance.

Referring to FIG. 2, the object (front) focal distance s is larger than that shown in FIG. 1; i.e. the code is further removed from the code reader. As a result, the back focal distance s'=s1'+s2' becomes smaller. To present an exact image on surface 6 of position-resolving photoreceiver 3, swivel arm 8 and thus also deflection mirror 7 are moved far enough in the direction of reception optics 4 to establish a back focal distance s'=s1'+s2's that corresponds to the encountered object focal distance s.

If the object focal distance s is shortened as compared to the arrangement shown in FIG. 1, swivel arm 8 and thus also the deflection mirror 7 are moved far enough away from the reception optics 4 until the corresponding, now greater back focal distance s'=s1'+s2' has been reached.

Figure 3:
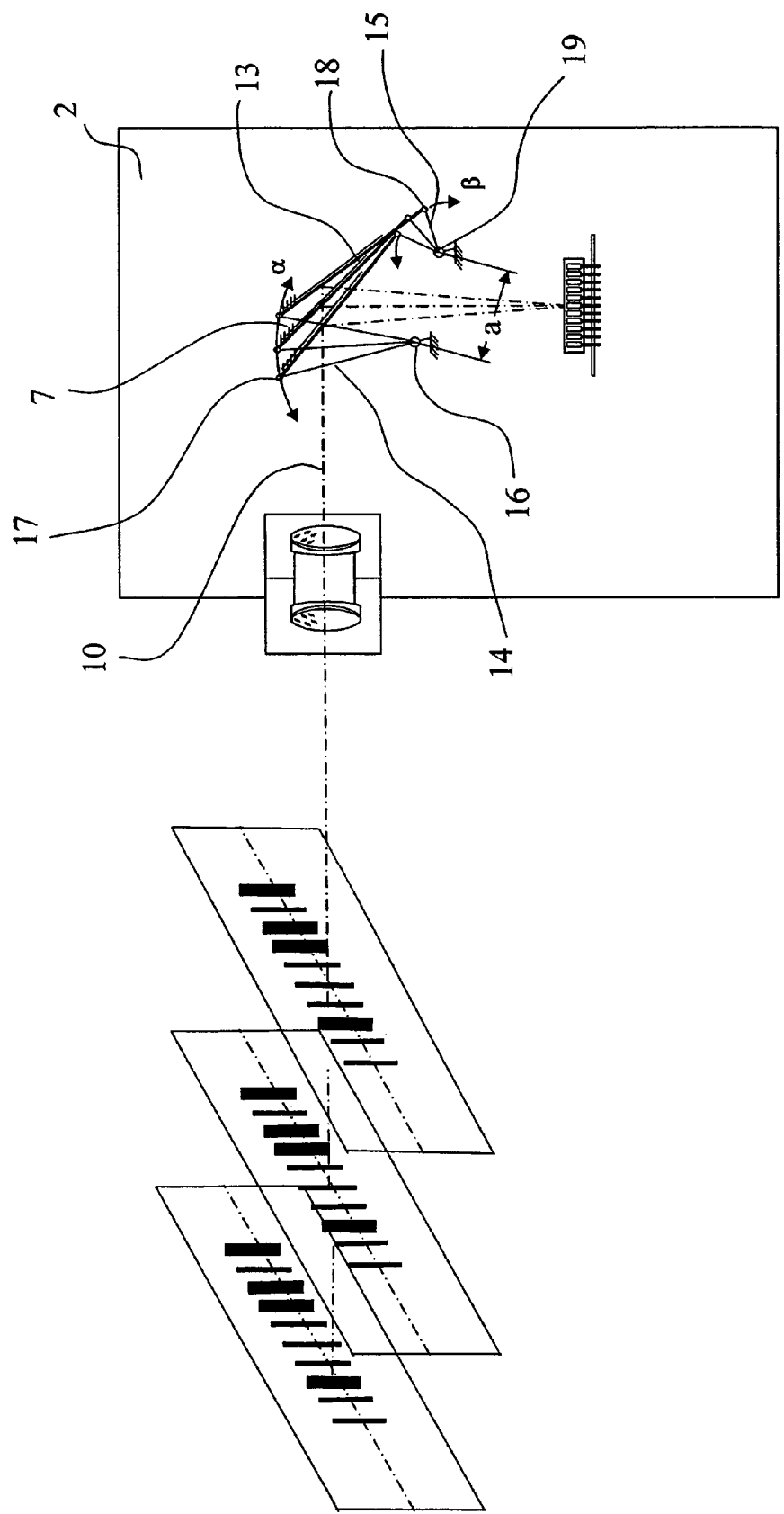
FIG. 3 shows an identification device which focuses by moving a deflection mirror with a four-bar linkage.

Referring to FIG. 3, deflection mirror 7 is mounted on a connecting rod 13 of a four-bar linkage. The four-bar linkage additionally comprises two links 14 and 15. Link 14 is connected at one end to a rotary bearing 16 secured in the housing 2. The other end of link 14 is connected to one end of a first (upper) end of rod 13 with a rotary bearing 17. One end of link 15 is connected to the other (lower) end of rod 13 with a bearing 18, and a second rotary bearing 19 secures the other end of link 15 to the housing. The axes of all four rotary bearings 16, 17, 18 and 19 are perpendicular to the optical axis 10 of the reception optics.

When link 14 in bearing 16 is swiveled through a given angle α, link 15 will turn by virtue of the connection via the connecting rod 13 through an angle β. Thus, the movement sequence of connecting rod 13 and the change in position and angle of the deflection mirror 7 relative to optical axis 10 of the reception optics is determined by the geometry of the four-bar linkage. The important parameters which establish the position and movement of mirror 7 are the length of connecting rod 13, the lengths of links 14 and 15, and the distance "a" between the two rotary bearings 16 and 19 secured in housing 2

The possibilities described above with reference to FIG. 1 for establishing the control variables for changing the position and angular orientation of deflection mirror 7 can also be used for the four-bar linkage. For example, a linear actuator can engage one of the two links 14, 15, or a rotary actuator can be coupled to one of the two fixed bearings 16, 19.

Since the necessary angular changes at the rotary bearings to properly adjust the deflection mirror 7 both in the solution for the embodiments shown in and described with reference to FIGS. 1 and 2 (using a swivel arm) and the embodiment shown in and described in connection with FIG. 3 (using a four-bar linkage) are relatively slight, the rotary bearings can be configured as a hinge. Such a hinge function can be produced very economically, for example, with a flat, flexible spring strip. One end of such a spring strip is fixed to the housing, while the other free end is secured to swivel arm 8 or to link 14 or 15, for example. When the angles of rotation are small, such hinges provide an excellent pivot function which is free of play and ensures stable pivotal motions that are free of wear for long periods of time.

What is claimed is:

1. An identification device for detecting a unidimensional and/or two-dimensional code comprising a housing, a position-resolving photoreceiver arranged in the housing, a reception optics associated with the photoreceiver installed in the housing, a position adjustable deflection mirror supported by a swivel arm that is pivotable about a pivot axis and arranged between the photoreceiver and the reception optics for changing an effective focal distance between the photoreceiver and the reception optics, and a flat, flexible spring strip operatively connected to the swivel arm, defining the pivot axis, and permitting pivotal movements of the swivel arm.

2. An identification device according to claim 1 wherein a center of an image of the code on the photoreceiver remains substantially unchanged when the focal distance is changed.

3. An identification device according to claim 1 wherein the drive comprises one of a linear actuator and a circular actuator.

4. An identification device according to claim 1 including a pivot shaft associated with the deflection mirror permitting pivotal movement of the mirror about an axis that is perpendicular to an optical axis of the reception optics.

5. An identification device according to claim 4 wherein the deflection mirror is pivotal about a limited pivot angle.

6. An identification device according to claim 1 wherein the flexible spring strip comprises a cross arrangement of the spring strip.

7. An identification device for detecting a unidimensional and/or two-dimensional code comprising a photoreceiver, a reception optics associated with the photoreceiver, a position adjustable deflection mirror for changing an effective focal distance between the photoreceiver and the reception optics, and a flexible spring strip having a first portion joined to the mirror and a second portion that remains stationary relative to the mirror, the flexible spring strip defining a pivot axis about which the mirror moves to change the focal distance.

8. An identification device according to claim 7 wherein a center of an image of the code on the photoreceiver remains substantially unchanged when the focal distance is changed.

9. An identification device according to claim 7 wherein the drive comprises one of a linear actuator and a circular actuator.

10. An identification device according to claim 7 including a swivel arm connecting the deflection mirror to the flexible spring strip.

11. An identification device according to claim 7 wherein the flexible spring strip comprises a cross arrangement of the spring strip.

* * * * *